(No Model.)
E. J. WEBB.
FLY SCREEN.
No. 340,840. Patented Apr. 27, 1886.
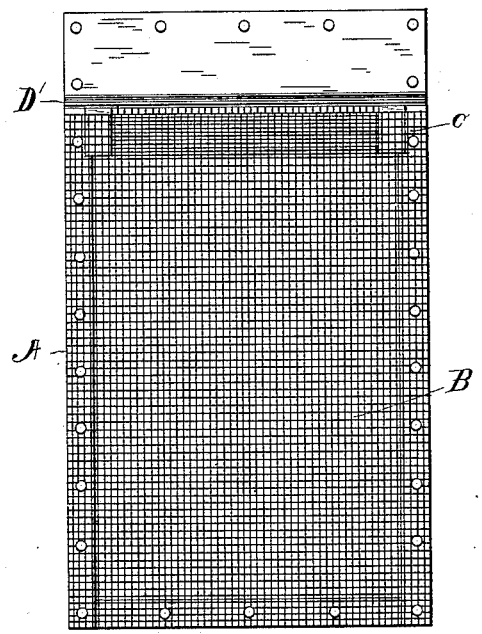
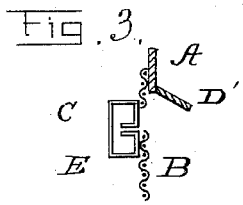
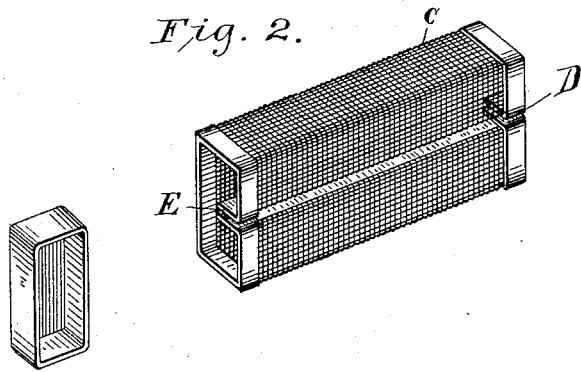
Witnesses
Jos. S. Latimer
Inventor
Elmore J. Webb
By Attorney

UNITED STATES PATENT OFFICE.

ELMORE J. WEBB, OF LAMONTE, MISSOURI.

FLY-SCREEN.

SPECIFICATION forming part of Letters Patent No. 340,840, dated April 27, 1886.

Application filed November 20, 1885. Serial No. 183,421. (No model.)

*To all whom it may concern:*

Be it known that I, ELMORE J. WEBB, a citizen of the United States, residing at Lamonte, in the county of Pettis and State of Missouri, have invented certain new and useful Improvements in Fly-Screens, of which the following is a specification, reference being had therein to the accompanying drawings.

My invention relates to certain new and useful improvements in door and window screens; and it consists in an attachment thereto by means of which a fly-trap is made.

In order that those skilled in the art to which my invention relates may know how to make and use the same, I will now proceed to describe it in connection with the accompanying drawings, in which Figure 1 is a front view of the outer face of the screen, and Fig. 2 is an end perspective view, showing the form of the device employed to catch the flies. Fig. 3 is a longitudinal section of a portion of the screen, showing the flange for stopping the progress of the flies and the trap in place.

In the drawings, A represents the casing of the screen, which is covered by the ordinary wire-netting, B, secured thereto in any suitable manner. At any suitable place on the screen, but preferably at the top, I place an elongated box, C, which may be attached to the screen in any convenient way.

In order that the insects which attempt to escape through the screen may readily be caught, I provide the box C with the opening D, which extends the whole length of the box, and through which the flies will pass when walking up the screen. In order that they may be prevented from going past this entrance, I provide the hanging flange D', which is placed just above the entrance to the trap, and bars further upward progress of the insect.

In order to prevent the escape of the flies which have once entered the trap, I provide the inwardly-extending flange E, which forms a narrow entrance to the trap, through which the flies are not likely to pass out.

I am aware that screens have been made with funnel-shaped escape-tubes, with the wide mouth inside for the escape of flies, and also that screens have been formed with offset portions, and a plate set in the opening thus made inclined in such a way as to permit the escape but bar the entrance of flies, and that screens have been formed with exit-openings shaded by a closed damper, and I claim none of these forms.

Having thus described my invention, what I claim, and desire to secure by Letters Patent, is—

1. The combination, with a door or window screen, of the elongated box provided with a narrow entrance and the overhanging flange, substantially as described.

2. In combination with a door and window screen, the elongated trap provided with a narrow entrance, the inwardly-projecting flange forming a narrow passage, and the removable end, substantially as set forth.

In testimony whereof I affix my signature in presence of two witnesses.

ELMORE J. WEBB.

Witnesses:
Z. F. BAILEY,
L. LUTHER.